United States Patent
Paksuniemi et al.

(10) Patent No.: US 6,952,600 B2
(45) Date of Patent: Oct. 4, 2005

(54) CONTROL OF AUDIO DATA OF A MOBILE STATION IN A CELLULAR TELECOMMUNICATION SYSTEM

(75) Inventors: Janne Paksuniemi, Lewisville, TX (US); Petri Ahonen, Jyväskylä (FI)

(73) Assignee: Nokia Corporation, Espoo (FI)

( * ) Notice: Subject to any disclaimer, the term of this patent is extended or adjusted under 35 U.S.C. 154(b) by 476 days.

(21) Appl. No.: 10/150,624

(22) Filed: May 17, 2002

(65) Prior Publication Data

US 2002/0191715 A1 Dec. 19, 2002

(30) Foreign Application Priority Data

May 21, 2001 (FI) .............................................. 20011061

(51) Int. Cl.[7] .............................................. H04B 1/38
(52) U.S. Cl. .................... 455/570; 455/278.1; 455/296; 381/71.1; 381/71.14
(58) Field of Search ................................. 455/221, 403, 455/570, 278.1, 116, 127.2, 67.7, 222, 424, 425, 67.11, 212, 214, 426.1, 426.2, 218, 63.1, 65, 506, 575.1, 550.1, 504, 552.1, 556.2, 561, 114.1, 114.2, 115.1, 115.2, 277.2, 295, 296; 375/340, 240, 241, 242, 216, 259, 262; 370/32.1; 379/390, 388, 389, 406.01, 206, 416.16, 410, 202; 381/66, 83, 71.1, 71.14, 95, 96, 93, 119; 704/275, 210, 215, 233, 201, 501, 246, 214, 219

(56) References Cited

U.S. PATENT DOCUMENTS

| | | | |
|---|---|---|---|
| 5,646,990 A | | 7/1997 | Li .............................. 379/390 |
| 5,799,244 A | * | 8/1998 | Matsumoto .............. 455/67.13 |
| 5,812,944 A | * | 9/1998 | Matsumoto ................. 455/403 |
| 5,839,110 A | * | 11/1998 | Maeda et al. ............... 704/275 |
| 5,963,898 A | * | 10/1999 | Navarro et al. ............. 704/220 |
| 6,542,611 B1 | * | 4/2003 | Lane et al. ................... 381/66 |
| 2003/0036378 A1 | * | 2/2003 | Dent .......................... 455/414 |

* cited by examiner

*Primary Examiner*—Edward F. Urban
*Assistant Examiner*—Charles Chow
(74) *Attorney, Agent, or Firm*—Perman & Green, LLP

(57) ABSTRACT

Controlling the presentation of audio data in a communication device includes receiving a certain first signal sequence with a microphone of the communication device, saving the first signal sequence to a temporary memory of a detector unit, receiving a certain second signal sequence with the microphone, and comparing the saved first signal sequence and the received second signal sequence to each other. If the compared signal sequences correlate, the received second signal sequence is attenuated before it is expressed with a loudspeaker or transmitted from an antenna.

14 Claims, 8 Drawing Sheets

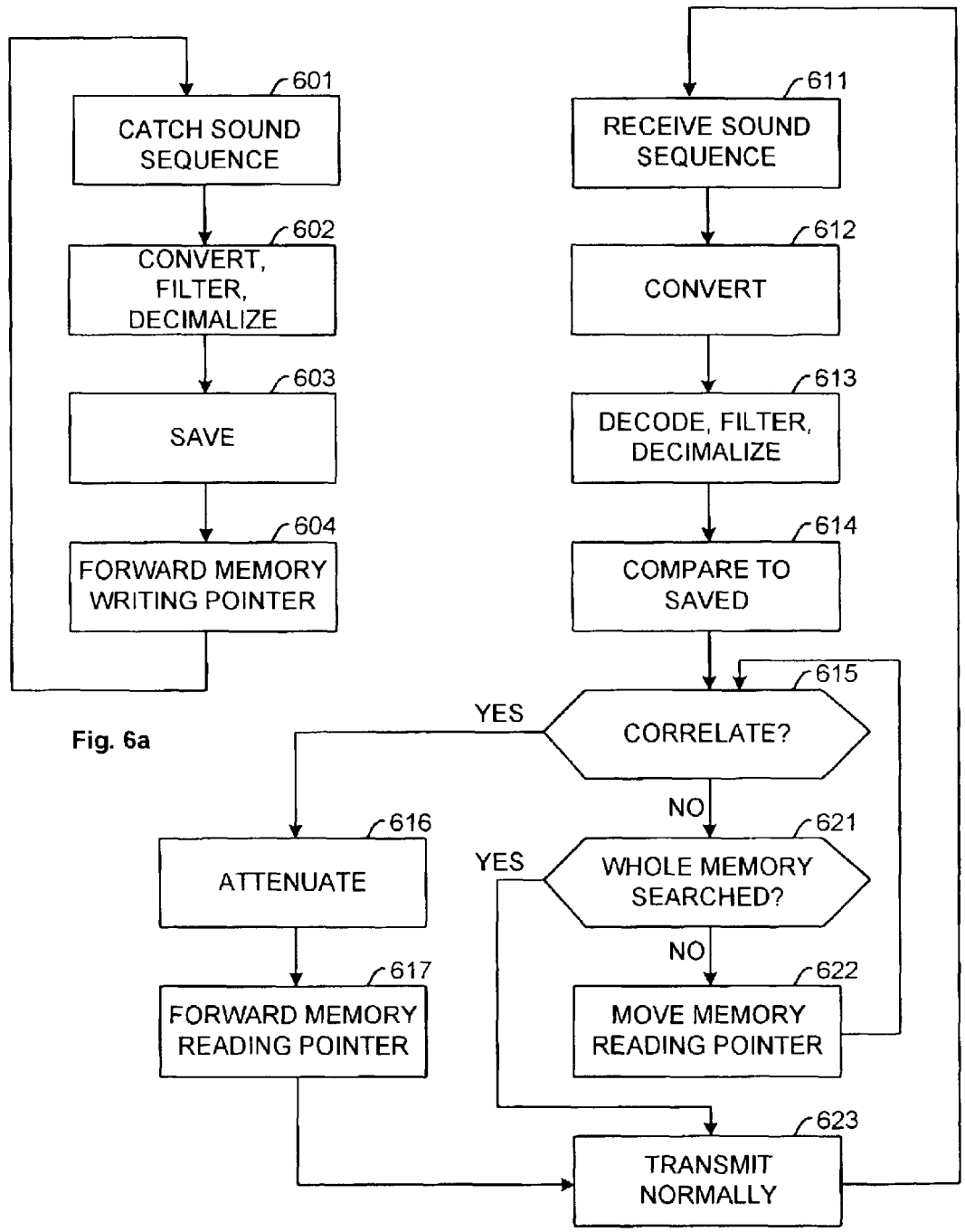

CONTROL OF AUDIO DATA OF A MOBILE STATION IN A CELLULAR TELECOMMUNICATION SYSTEM

TECHNICAL FIELD

The invention relates to controlling audio data of a mobile station while the mobile station has a connection with another or several mobile station(s). In particular, the invention relates to controlling the presentation of audio data in a device, which is at a range of audibility from another device in the same active connection.

BACKGROUND OF THE INVENTION

At first, we shall discuss some properties that are typical of cellular telecommunication systems. The discussion will concentrate on digital cellular systems, such as GSM (Global System for Mobile Communications) and TETRA (Terrestrial Trunked Radio). Digitalization reduces the expenses of operators and users and facilitates the building of interfaces to other digital data transfer systems. Compared to an analogue, trunked radio system, the operation of a digital radio system is more versatile, because it has added properties, which the analogue system lacks. In addition, data transfer is more reliable and the frequency band is utilized more efficiently.

An example of digital cellular telecommunication systems is TETRA, which is a new, European standard for trunked radio systems. TETRA is an example of a PMR (Professional Mobile Radio) network, which is used by organizations, such as the police or the fire brigade, in order to get certain properties to their own communication network. The most important properties of a system according to the TETRA standard include firstly, encryption of messages to prevent outsiders from accessing the messages, secondly, the priority of the message, which guarantees that the most important message is heard and interrupts the others, and thirdly, group operations, by means of which a certain group communicates easily and reliably.

ETSI (European Telecommunications Standards Institute) has developed the TETRA standard together with leading producers, system operators and users. TETRA is a cellular system, in which a certain centre manages a relatively large number of base stations. Both actual payload data and control data, or signalling, are transferred between the base stations and mobile equipment. The user does not hear the signalling, and thus need not pay attention to it. The users, or actually the mobile equipment used by them, may constitute groups, in which each piece of equipment belonging to a certain group can hear all the equipment in the group. The way how connections of the point-to-multipoint type required by group communications are formed on the network side is not essential with regard to the present invention.

The processing of audio data in a piece of mobile TETRA equipment will be discussed briefly. A corresponding discussion is also more generally valid for a typical piece of mobile communication equipment in a cellular network. A Coder-Decoder, or CODEC, codes (or encodes) the audio data to be transmitted and decodes the received coded audio data. In the general manner, coding consists of source coding (speech encoding) and channel coding, and decoding consists of channel decoding and source decoding (speech decoding). In TETRA, the source coding method is parametric coding, in which the waveform of the sound is not coded directly, but certain parameters are calculated from it, and on the basis of that the receiving device synthesizes the original sound and produces a copy of it. Thus speech decoding can also be called speech synthetization in TETRA.

TETRA is a Time Division Multiple Access (TDMA) network, in which each transmission frequency has four independent transmission channels and the difference between transmission frequencies is 25 kHz. The TDMA transmission frame is ca. 56.67 ms long and it consists of four time slots of even length. In a single time slot, the transmitting device transmits a digital burst, which represents a voice sequence of 60 ms. Consecutive TDMA frames form a superframe structure, which is repeated at intervals of 1.02 seconds and in which 17 TDMA frames are followed by a signalling frame as the 18th frame.

The data rate in TETRA may vary from 2.4 kBit/s to 28.8 kBit/s. The lowest rate is in use when one time slot is used for data transfer and thus very reliable operation is required. The highest rate is achieved when the protection protocol is not used at all and when all four time slots of the TDMA frame can be used for data transfer.

One of the properties of cellular systems is the above mentioned possibility to use group connections. The users of equipment in a group connection may be members of more than one group. If there are several groups, speech groups have different priorities. This ensures that the user always hears the message with the highest priority, i.e. the one classified as the most important. When a message with a higher priority is received, the device silences messages with lower priority and reproduces the one with the highest priority. The operational area of the speech group may be either the whole network or part of it, depending on the user's need. The messages of the speech group are not heard outside a certain area.

Problems have occurred in group connections when two communication devices of the same group are close to each other and the first of them transmits speech or other audio data to the group. A corresponding problem also occurs in a connection between two devices, if the devices are sufficiently close to each other even for a moment. As an example, we shall consider a situation in which the user has two devices: a communication device installed in a car and a mobile communication device which can always be carried by the user. It is assumed that both communication devices are in the group mode and they are connected to the same user group. Now the user wants to send a message to the other members of the group. When the user speaks to the group through the communication device installed in the car, the transmitted sound message is also received almost simultaneously in the user's mobile communication device. The mobile communication device receives the transmitted sound message after the period of time needed for the sound message to proceed in the network. Then the mobile communication device reproduces the sound, whereupon the communication device installed in the car catches the sound message again and transmits it back to the network. This creates a situation in which the sound circulates.

The customary echo cancelling alone does not remove this problem, because in it the purpose is to prevent the message reproduced by the loudspeaker of the device from proceeding to the network again via the microphone of the same device. Acoustic echo cancelling functions so that when the microphone of the device catches the sound just reproduced by the loudspeaker, it can be attenuated and it is thus practically not re-transmitted to the network. In the present audio circulation problem, the re-circulating sound comes from the loudspeaker of another device, and information about it is not obtained by the customary echo cancelling means in the other device, which now sends the sound to circulate.

SUMMARY OF THE INVENTION

It is an objective of the invention to improve voice transfer properties in cellular systems so as to mitigate especially the above mentioned circulation problem.

The objective is achieved so that the communication device of the cellular system monitors locally the sounds it has detected, compares them to the received audio data and attenuates, when required, a sound which is similar to the locally detected sound.

The invention is characterized in what is set forth in the characterizing parts of the independent claims.

According to the invention, when a certain communication device has an active connection with another communication device or belongs to a group of communication devices, it monitors the signals it receives. Information concerning signals, which the communication device has just received via its own microphone, have been saved in the memory of the communication device. According to the invention, this information is compared to the received signal. If it is found that these two signals correlate, the received signal is attenuated. This prevents the circulation of data back to the network.

The invention does not as such limit the point where the comparison of the audio signal processing chain is carried out. However, it has been found advantageous to save the sound caught via the microphone either in source non-coded (speech non-encoded) or source coded (speech encoded) form, but before channel coding in any case. Then it can be compared to a signal received from the network, when channel coding has been removed from the signal and source coding either has or has not been removed, depending on the point in the audio signal processing chain where the comparison is carried out. On the one hand, comparing between speech and channel coding is practical and advantageous, because thus it is possible to process the discrete bit sequences which represent voice sequences of 60 ms. On the other hand, by comparing source non-encoded signals it is possible to avoid certain synchronization problems.

The saved signal can also be used as a reference point for a signal which is received a moment later by the same device via its own microphone and not from the network. If such a comparison shows that the signals are the same, the microphone of the device has captured a copy of what the user of the transmitting device has just said earlier, reproduced by a device which is near and belongs to the same group. According to the invention, such a copy received later can be attenuated so that the device does not send it to the network.

BRIEF DESCRIPTION OF DRAWINGS

The solution according to the invention will now be described in more detail with reference to the attached drawings, where FIG. 6a shows the operation of a transceiver according to a fourth preferred embodiment of the invention as a flowchart, and FIG. 6b shows the operation of a transceiver according to a fourth preferred embodiment of the invention as a flowchart.

DETAILED DESCRIPTION OF THE INVENTION

Figure 1:
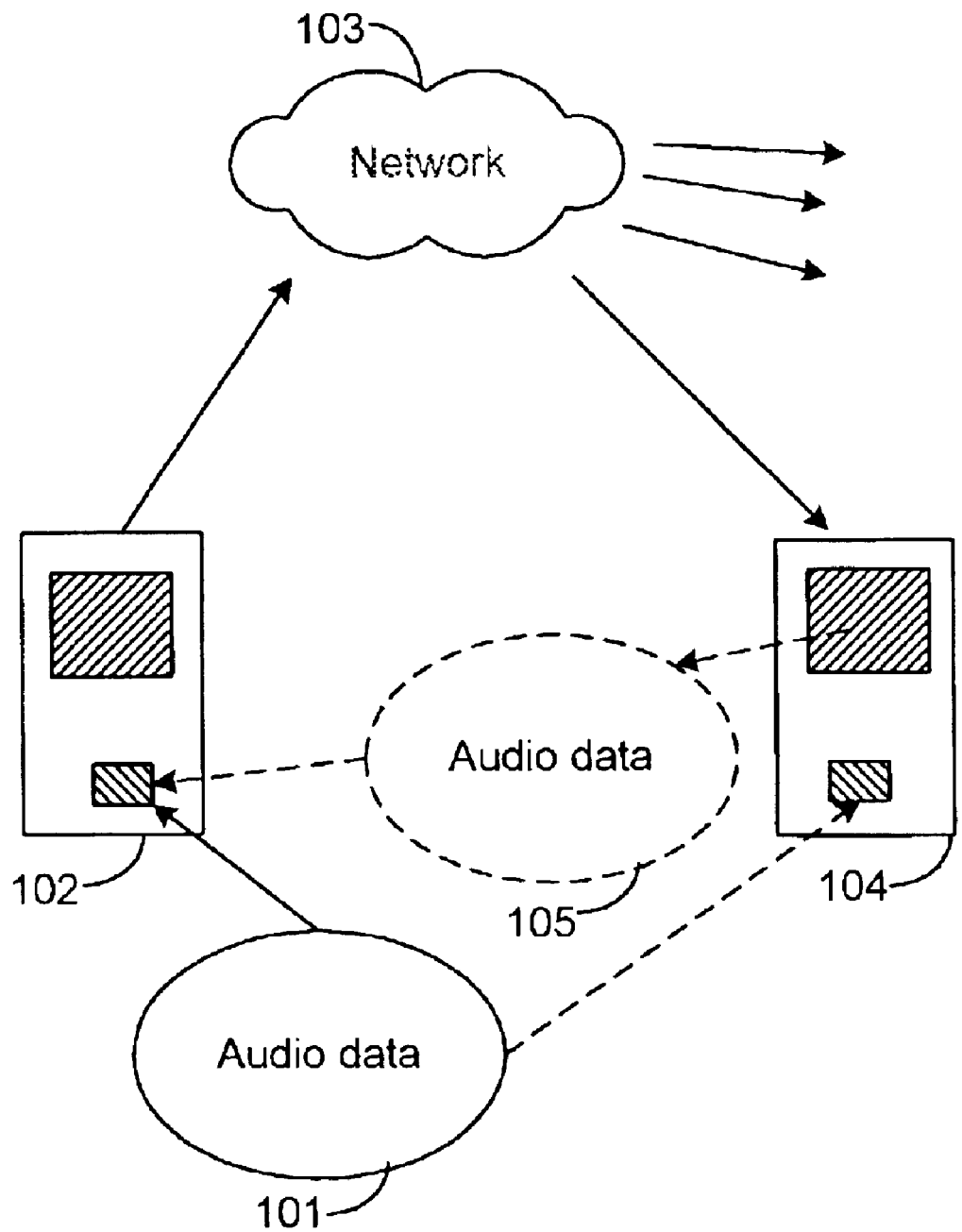
FIG. 1 shows a situation which causes problems with the current technology.

FIG. 1 shows two communication devices: a first communication device 102 and a second communication device 104. The first communication device 102 can be, for example, a transceiver installed in a car, and the second communication device 104 can be a transceiver, which the user can carry along when leaving the car. The communication devices can also be in the same car, for example, or they can be communication devices of different users close to each other, belonging to the same group or having a connection with each other. With regard to the invention, it is essential that these two devices having a connection with each other are at least momentarily at a range of audibility from each other. For the sake of clarity, in this description the communication devices differ from each other so that the first communication device 102 only transmits and the second communication device 104 only receives messages. In practice, the devices are similar transceivers, but the operations of the receiver and the transmitter can be illustrated more clearly when they are shown in different devices.

In FIG. 1, the user sends a voice message 101 by the first communication device 102 to devices belonging to the same group. The first communication device 102 is in the group mode, i.e. it hears all the messages of the group to which it is connected. The same user also has another communication device 104, which belongs to the same group as the first communication device 102. In this example, the user transmits the message to the members of the group with the first communication device 102 by setting up the connection and speaking to the microphone of the first communication device 102. The user's speech, voice data 101 is sent via the first communication device 102 further to the network 103.

The network 103 transmits the voice data further to all the devices belonging to this group. In this example, the connection between the network 103 and the group—when the devices are in the group mode—is a point-to-multipoint connection, which means that the network 103 transmits the message to a number of devices simultaneously. It depends on the network delay how long it takes before the devices belonging to the group receive the message. In addition, the message can be received with different devices of the group at different times, because the distance in the network becomes longer, and thus it takes more time if the devices are under different base stations or even under different switching centres. In any case, the message sent to the group is also received in the second communication device 104 of the user who sent the message. In this example, the first communication device 102 is thus a transmitting communication device and the second communication device 104 is a receiving communication device. The second communication device 104 reproduces the message received with its loudspeaker 105. When the transmitting communication device 102 and the receiving communication device 104 are close to each other, the transmitting communication device 102 catches the message 105 sent by itself and reproduced by the receiving communication device 104 and sends it to the network again. Thus the voice circulates in the network and causes interference.

The circulation problem occurs as similar always when two communication devices having a connection with each other are so close to each other that the voice coming from the loudspeaker of one is audible in the microphone of the other. A situation like this is very common when, for example, firemen or policemen are walking in a building. Then many devices belonging to the same group move in a relatively small area, and thus a number of devices may be at a range of audibility from each other.

Reproducing the message in the second communication device 104 of its sender or in any other communication device, which is at a range of audibility from the first communication device 102, is redundant. If the message is not reproduced in such a communication device of the group, which has heard the message already at the transmission stage, the message does not start circulating the network any more. The most advantageous way to implement this is to compare in the communication device 104 the audio signal caught by its own microphone to the audio signal received. If these signals correlate, the received audio signal is attenuated strongly before sending it forward. For the user, the audio signal is not reproduced. This is done by attenuating the audio signal sufficiently, because removing the audio signal entirely would cause a perceivable response in the operation of the device for the user. On the other hand, the transmitting device 102 could compare the message caught by its microphone to the one just sent by it. If these correlate, the message would be sent forward as attenuated to almost non-existence.

Figure 2A:
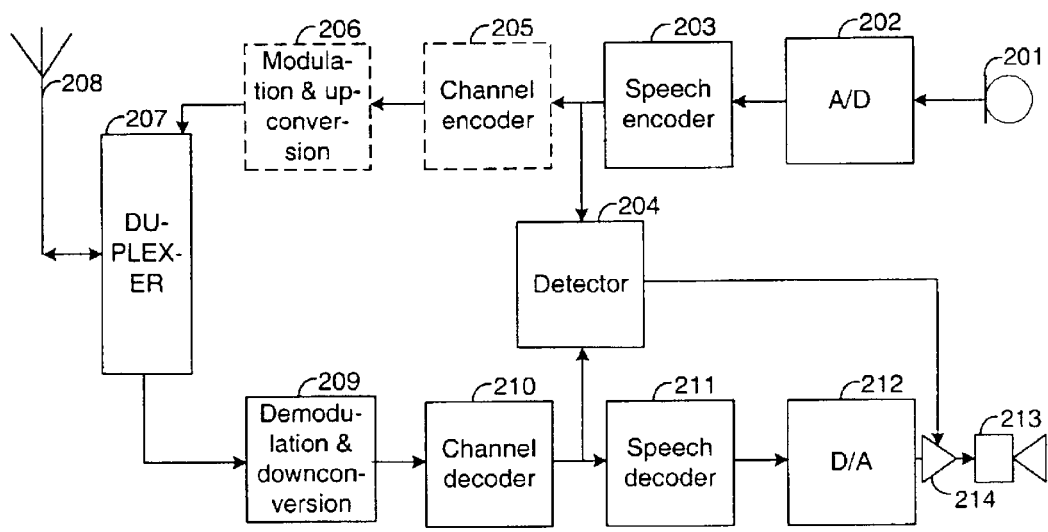
FIG. 2a shows the operation of a transceiver according to a preferred embodiment of the invention.

FIG. 2a illustrates in more detail a communication device 104 according to a preferred embodiment of the invention. This device does not transmit but only receives a message. In practice, of course, the transmitting device also receives and the receiving device transmits. Because this discussion concentrates on the proceeding of a certain, possibly problematic signal in transmitter/receiver devices, it is easier to deal with these operations separately. Therefore we present separately a case in which the device transmits a message and a case in which the device receives a message.

Audio circulation thus becomes a problem when two communication devices are close to each other, in which case the transmitting communication device catches the message for recirculation from the output of the receiving communication device. Because the communication devices are close to each other, it is clear that when the user sends a message via the first communication device, i.e. speaks to the microphone of the transmitting communication device, the second, receiving communication device also hears it i.e. detects the audio data.

The message to be transmitted, or speech in this example is at first directed to the microphone 201 of the device. The message to be processed is called audio data, and it is processed in the communication device at signal level as a(n) (audio) signal. From the microphone, the signal is directed to the A/D converter 202, in which the received analogue signal is converted to digital. The speech encoder 203 carries out the source coding which, in TETRA, for example, is parametric speech encoding.

In order to prevent circulation, the signal caught via the microphone is saved in the communication devices to the temporary memory of the detector 204 after speech encoding at point 203. It is advantageous to carry out intermediate saving at this point, because according to the nature of speech encoding, the signal is relatively well packed and does not take up excessive space. As such, temporary saving in the memory can be used between the speech encoder and channel encoder also for other purposes during normal transmission operation. However, with regard to this embodiment of the invention, it is essential to carry out this saving when the device does not operate as a transmitting device itself, but only catches sound from its near environment with its microphone.

In the next step, the same signal comes to the receiving communication device via the antenna 208 and duplexer 207 for processing. When the received signal has been demodulated and converted to the baseband frequency 209, and the channel decoder 210 has decoded the channel coding, the signal can be compared to the signal in the memory of the detector 204. At this stage, the time it takes for the signal to proceed in the network must be taken into account. This network delay is typically some hundreds of milliseconds. In practice, this requires that the memory unit of the detector 204 is sufficiently large so that it still contains information about the signal caught through the microphone when a corresponding signal comes from the network. If the network delay is known at least roughly, the reading of the memory unit can be started from a certain area, which precedes the present writing area for the amount of the estimated network delay. The previously transmitted signal has been saved in this area of the memory. If the network delay is not known or it cannot be predicted reliably, the received signal can be compared with any or all data in the memory. If the comparison of the signal in the memory and the signal received from the antenna shows that they correlate, the detector 204 sends to the attenuator 214 an instruction to attenuate this signal before it is reproduced with the loudspeaker 213. For example, the attenuation can be carried out after speech coding 211 with a digital attenuator, or, as shown in the drawing, with an analogue attenuator after the A/D conversion 212. Thus the sender or some other nearby user belonging to the same active connection does not redundantly hear the message already heard at the transmission stage, and audio circulation does not occur, either.

Figure 2B:
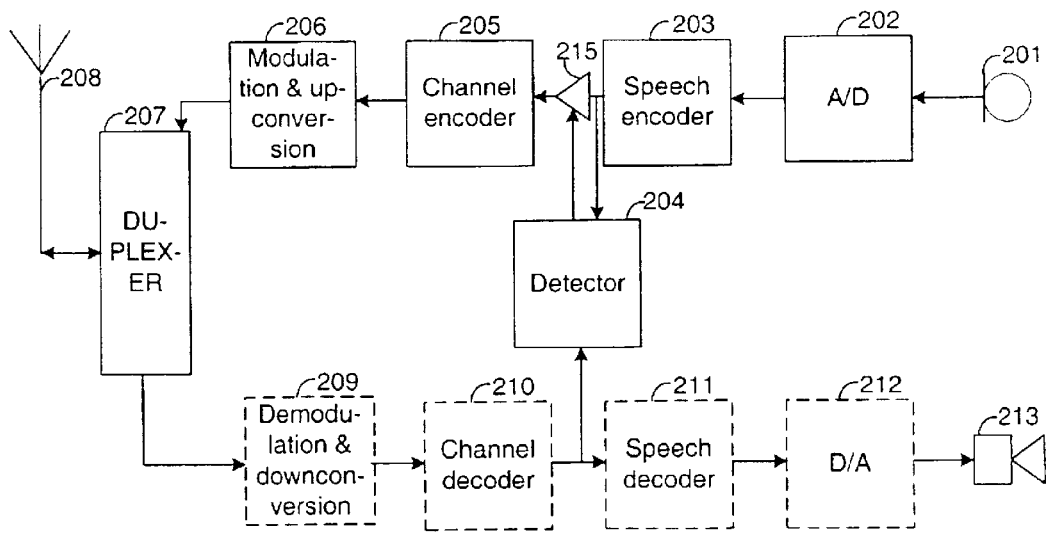
FIG. 2b shows the operation of a transceiver according to a second preferred embodiment of the invention.

FIG. 2b shows a situation according to the second preferred embodiment of the invention. The operation of the transmitting communication device 102 is described here. When the user sends a message, the microphone 201 receives an audio signal. An A/D converter 202 converts the signal into digital form and a speech encoder 203 carries out the source coding. After this, the packed speech frames are saved in the memory unit of the detector 204 before the channel coding 205 of the signal. In step 206, the signal is modulated and converted to the transmission frequency. Then the signal is transmitted via the duplexer 207 and antenna 208 out from the equipment as radio waves.

Next, a communication device at a range of audibility, which has a connection with the communication device shown in FIG. 2b, receives the transmitted message and reproduces it with its loudspeaker. Because these two devices are at a range of audibility, the device shown in FIG. 2b catches that sound again to its microphone 201. The communication device 2b digitizes 202 the message and source codes it 203. After this, according to the second preferred embodiment of the invention, the speech frames are compared with the speech frames in the memory of the detector 204. When these are found to correlate, the detector 204 controls the attenuator 215 so that it attenuates these frames before transmitting them from the antenna 208. Thus the message already sent once does not cause a circulation problem in practice, because it is sent to the network as substantially attenuated. The invention does not set special requirements as to at which point of the transmission branch the attenuation is carried out.

Figure 2C:
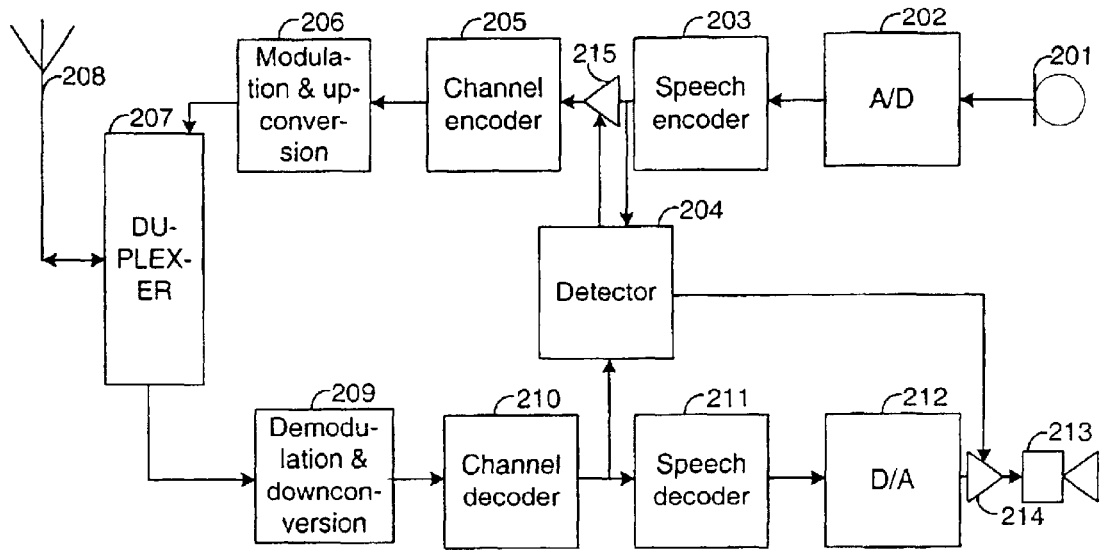
FIG. 2c shows the operation of a transceiver according to a third preferred embodiment of the invention.

FIG. 2c shows a solution according to the third preferred embodiment, in which the device operates both as a transmitting and receiving communication device. As presented above, the signals received via the microphone 201 are converted to digital 202 and speech coded 203. After this, according to the third preferred embodiment, certain speech frames of the speech coded signal are saved in the memory unit of the detector 204. These speech frames are also compared to the speech frames already in the memory, and if it is detected that they correlate, the detector 204 gives the attenuator 215 an instruction to attenuate these coming speech frames. The attenuator 215 attenuates the detected signals that have already been sent once before the channel encoder 205. The operations carried out after this are channel coding 205, modulation and upconversion 206. Then the signal proceeds via the duplexer 207 and antenna 208 to the output. The signal received via a microphone can thus be a signal to be sent by means of a communication device as radiowaves to the network and further to the receiver(s), or a signal which has already been transmitted once with this device, and is now received again via the microphone. This latter takes place when the other device receiving a message reproduces the message with its loudspeaker at a range of audibility from the transmitting device.

On the reception side of FIG. 2c, the signal received from the antenna 208 is directed to the duplexer 207, whereafter the signal is demodulated, down-converted 209 and channel decoded 210. After this, the signal is in a speech coded form, whereupon certain frames are again directed to the detector 204 for comparison and saving. If the speech frames correlate with the frames already in the memory, the detector directs the attenuator 214 so that it attenuates these signals. In this example, the attenuator has been placed after the speech decoder 211 and the D/A converter 212. The attenuator could as well be located between the speech decoder 211 and D/A converter 212 with the difference that then it should be a digital attenuator instead of an analogue attenuator shown in the figure. With regard to the invention, the essential feature is the fact that the signal is attenuated before it is expressed with the loudspeaker 213 or transmitted from the antenna 208.

Figure 2D:
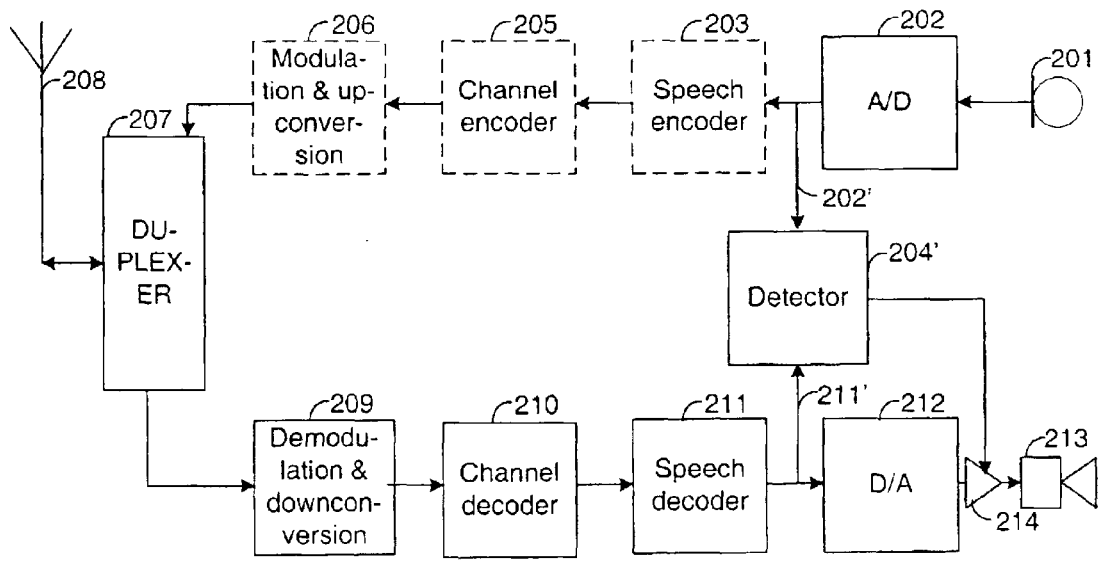
FIG. 2d shows the operation of a transceiver according to a fourth preferred embodiment of the invention.

Voice equipment according to the fourth preferred embodiment shown in FIG. 2d operates essentially in the same way as the device shown in FIG. 2a. Thus the device shown in FIG. 2d does not transmit but only receives data. The difference from FIG. 2a is only the fact that the samples considered here are taken from the digitized sound. This is also done in FIGS. 2e and 2f. Embodiments, in which the samples are saved from the digital sound, are easier to implement in practice. The customary echo cancelling has also been carried out in communication devices at this stage of signal processing. According to the invention, these two, the customary echo cancelling and the elimination of audio circulation can operate parallelly in the devices. Synchronization does not constitute a problem in the embodiments which sample digital audio data, unlike in the embodiments which sample in speech coded form, shown in FIGS. 2a, 2b and 2c. Therefore the embodiments 2d, 2e, 2f are more easily adapted for different devices and systems. Nevertheless, if the synchronization problem is solved, the method according to the embodiments of FIGS. 2a, 2b, 2c, in which speech coded data is saved, is optimal, because it consumes a minimal amount of memory space, when the speech is in an optimally packed form. In addition, the data compared in the embodiments of FIGS. 2a, 2b and 2c is source coded. Here it has to be remembered that all speech parameters are not protected. If an unprotected parameter disappears or changes in the network, it is ignored. However, such a corrected signal does not correlate with the original. Comparison errors like this do not take place, if only protected parameters, which are protected by the channel encoder 205 and recognized by the channel encoder 210, are examined. If the channel decoding fails for some reason at the receiving end, the situation is handled in all embodiments so that the channel decoder 210 notifies the detector 204, 204' that there is an error in the frame or its processing. Such an erroneous frame is then not even attempted to compare with the detector 204, 204'.

In FIG. 2d, when the microphone 201 receives the sound, it is converted to digital 202. After this, the speech signal is low-pass filtered and decimalized 202'. The low-pass filter operates as a folding prevention filter, due to which a certain sample can be unambiguously reconstructed. Decimalizing is used to pack the speech signals to a smaller size, but this is not done by blocks, and thus no synchronization problem occurs. The decimalization ratio used is selected according to application. Generally, a quality which is substantially lower than the quality of the speech reproduced is sufficient as the quality of the samples. A digital, decimalized sample is saved in the memory of the detector 204'.

In FIG. 2d, the signal coming from the network to the antenna 208 is directed via the duplexer 207 for demodulation, down-conversion 209 and channel decoding 210. After speech decoding 211, corresponding low-pass filtering and decimalizing 211' are performed as on the reception side at point 202'. Then the samples are compared to the samples in the memory of the detector 204'. Thus the signal sequences which correlate with a certain probability are found. The attenuator 214 is controlled so that if the sound is already heard once, its repetition with the loudspeaker 213 is almost imperceptible in practice.

Figure 2E:
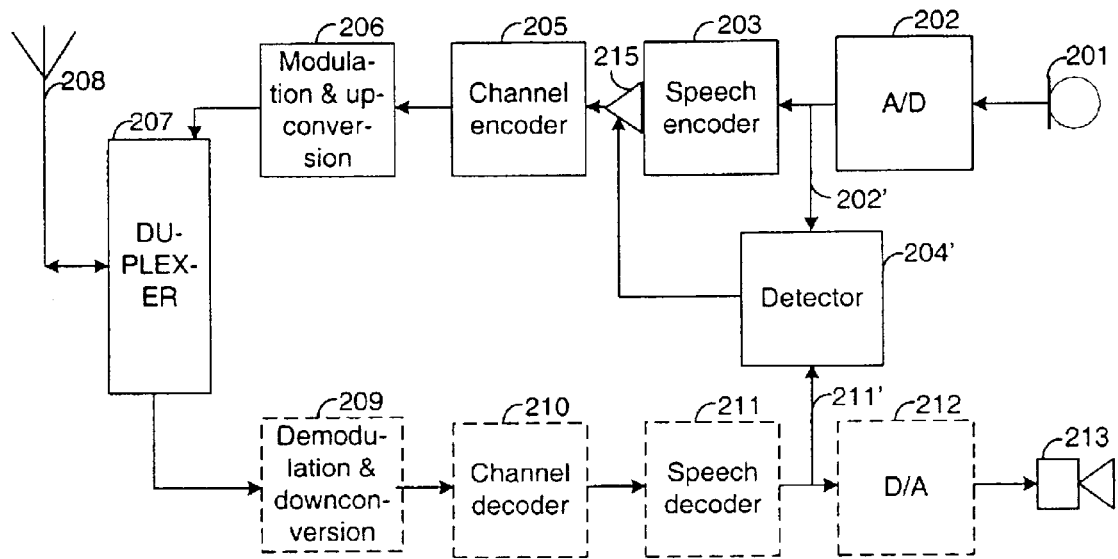
FIG. 2e shows the operation of a transceiver according to a fifth preferred embodiment of the invention.

The fifth preferred embodiment shown in FIG. 2e corresponds to the embodiment shown in FIG. 2b; only the detector is at a different point. These figures present a transmitting device. Thus the signal to be transmitted comes via the microphone 201 to the A/D converter 202, whereafter, according to the fifth preferred embodiment, the signal is low-pass filtered and decimalized 202', and the sample is saved in the memory of the detector 204'. After this, the signal to be transmitted is speech coded 203, channel coded 205, modulated and up-converted 206 and transmitted via the duplexer 207 to the antenna 208, from which the message is transmitted to the network.

The device shown in FIG. 2e hears the message it has transmitted, when the adjacent device repeats it and the microphone 201 of the device in FIG. 2e catches it. The signal is digitized 202, whereafter the signal received via the microphone is decimalized and low-pass filtered 202'. The detector 204' examines whether the produced samples correlate with the samples in the memory. When correlation is found, the detector 204' directs the attenuator 215 to attenuate the signal before its transmission from the antenna 208. In this embodiment, the attenuation 215 is carried out either before the channel encoding 205 or before the speech encoding 203.

Figure 2F:
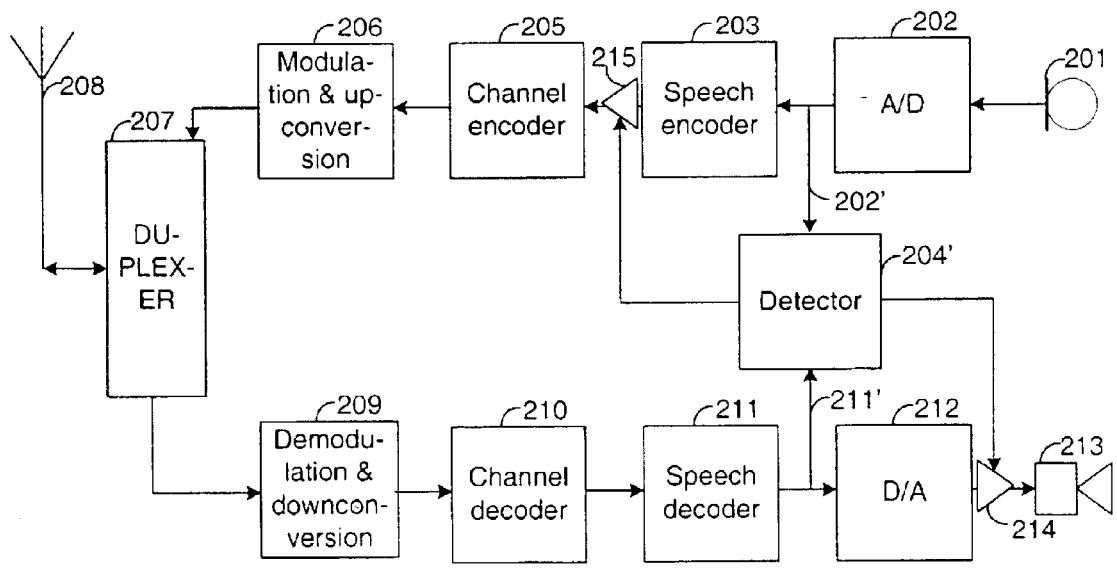
FIG. 2f shows the operation of a transceiver according to a sixth preferred embodiment of the invention.

FIG. 2f shows a device according to the sixth preferred embodiment of the invention, which operates both as a transmitting and receiving device. During transmission, speech data is directed from the microphone 201 to the A/D converter 202, after which the signal is sampled 202' in a corresponding manner as was explained in the description of the fourth preferred embodiment shown in FIG. 2d or the fifth preferred embodiment shown in FIG. 2e. The samples are compared to the samples in the memory of the detector 204'. If the samples correlate, the attenuator 215 is controlled, and if the samples do not correlate, they are saved in the temporary memory of the detector 204'. The signal is speech coded 203, channel coded 205, modulated and up-converted 206 and transmitted via the duplexer 207 and the antenna 208 to the network. When required, the samples are attenuated 215 before speech coding 203 or before channel coding 205.

In the downlink direction or receiving direction, the antenna 208 receives radiowaves. The signal received from the antenna 208 is transmitted to the duplexer 207, which enables maintaining a duplex connection in the device. In step 209, the received signal is demodulated and converted to the form processable in the receiving device, i.e. baseband frequency. The channel decoder 210 decodes the channel coding so that it reconstructs the signal received via the antenna 208 from the output of the demodulator 209. The channel decoder 210 can detect and even correct errors occurring in the output of the demodulator 209. The speech decoder 211 decodes the speech coding of the signal. Operations 211' that are inverse to those carried out at point 202' are now again carried out for the signal, and the new samples are compared to the saved ones. If the samples correlate, an attenuation instruction is given to the attenuator 214. The new samples are saved in the memory of the detector 204'. After this at point 212, the binary signal is modulated to analogue, attenuated when required 214 and outputted from the loudspeaker 213.

In the following, the operation of the transmission and reception branches of the preferred embodiments will be described with reference to flow charts, when the invention is used to prevent audio circulation in a communication device. Especially the operation of the detector 204, 204', which occurs in the FIGS. 2 will be described in more detail.

Figures 3A, 3B:
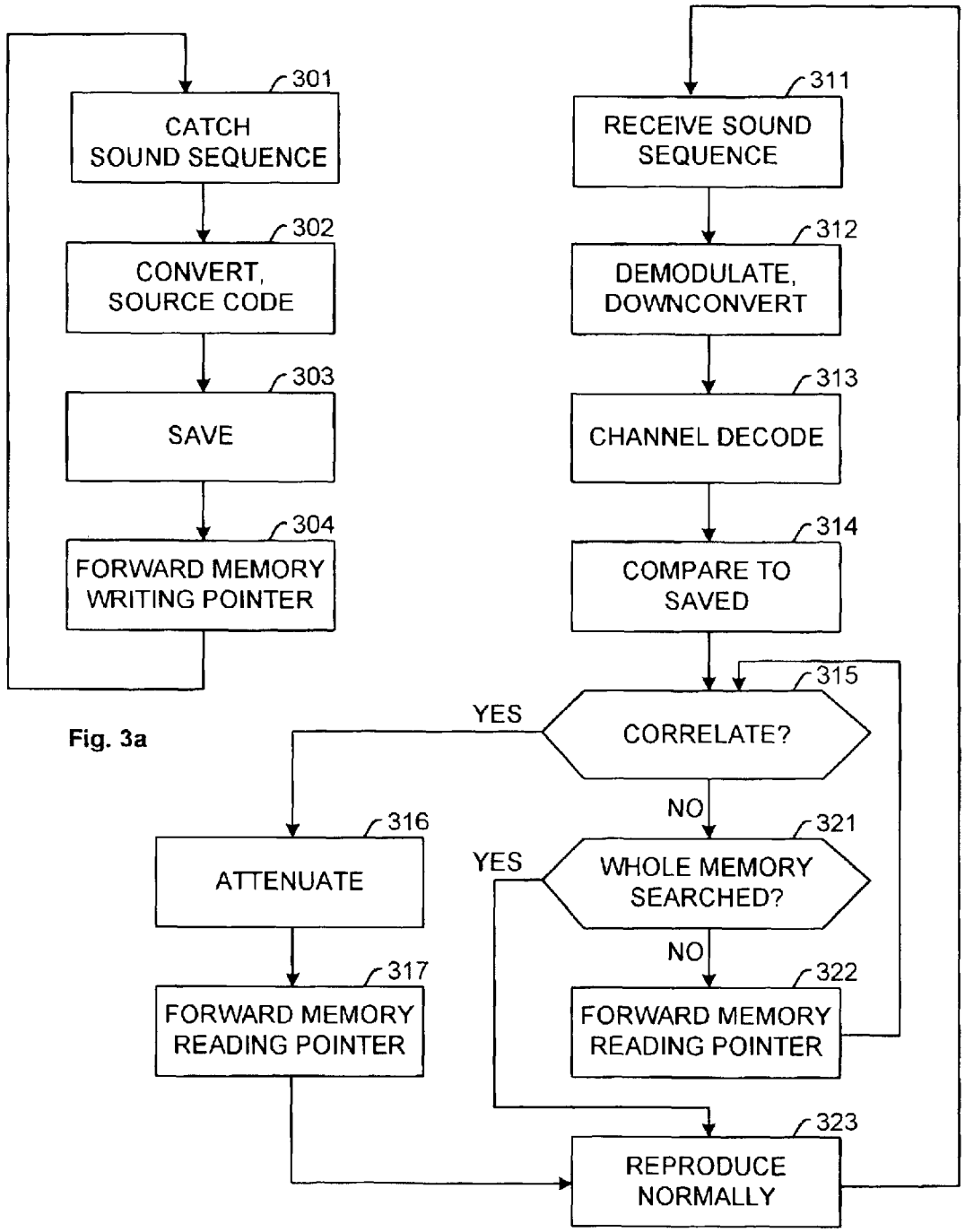
FIG. 3a shows the operation of a transceiver according to a preferred embodiment of the invention as a flowchart.
FIG. 3b shows the operation of a transceiver according to a preferred embodiment of the invention as a flowchart.

FIG. 3a shows the operation of the transmission branch. The device according to the invention is presented here as used in a communication device, which does not transmit. As was mentioned earlier, it suffices that two devices have a connection with each other, or in practice the data transmitted and received are saved and compared always when the device is active. In step 301, in the transmission branch of FIG. 3a, the microphone catches audio data. According to the description of the invention, this caught audio data is now the data that a user of an adjacent device wants to send with his own device. In step 302, the caught sound sequence, which is advantageously a similar sound sequence of 60 ms which is also used in speech encoding, is digitized and source coded (speech encoded). In step 303, the sound sequence is saved in the temporary memory. In step 304, the writing pointer of the temporary memory is moved to point to a location from which the writing of the next sound sequence can start, so that the next speech encoded sound sequence of 60 ms to be saved would not overwrite the previous one.

In the reception branch shown in FIG. 3b, the signals received from the network are transmitted normally via the antenna and duplexer 311. Step 312 covers all demodulation and down conversion steps, which are included in normal reception. In step 313, the device decodes from the received frame, which advantageously represents a sound sequence of 60 ms, the channel coding but not yet the speech coding. In step 314, the signal sequence thus received is compared to a certain second signal sequence, which is read from the memory to which the second signal sequence has been saved by step 303 of the transmission branch. If the network delay is known, the reading from the memory required by step 314 can be started from a point which represents a point in time which is earlier by the known delay. If the delay is not known, the reading according to step 314 is started e.g. only from the point to which the reading pointer of the memory happens to be pointing at the moment. Generally the situation is such that the devices move, and the network delays cannot be entirely predicted. There is considerable variation in the delays, because the devices can be under different base stations or mobile switching centres. It is possible to examine the whole memory to make sure that all possible correlations are found.

The temporary memory located in the detector 204, 204' shown in FIGS. 2 is preferably a so-called ring memory, which refers rather to a method for managing the use of the memory than any physical structure. The ring memory has a certain number of memory locations, which are filled beginning from an arbitrarily selected starting point. When the ring memory has been filled, the writing starts again from the beginning, i.e. the oldest information in the memory is always overwritten by the newest information. In other words, the information remains in the memory for such a period of time that it takes to fill up the memory once. The size of the memory unit determines how long certain information remains in the memory.

In step 315 it is compared if the signal sequence received from the network correlates with a certain accuracy with a signal sequence saved locally earlier. There are many algorithms available that can be used to study correlation, and these are used in the customary echo cancelling, for example. Signals are thus compared with a certain accuracy, such as the error of the least squares sum, for example. Alternatively, it is possible to examine the nature of the waveform or analyze certain parameters. If the signals to be compared correlate, the process moves to step 316, in which the attenuator is directed to attenuate the signal sequence before it is reproduced by a loudspeaker. After this, the memory reading pointer is moved to point to a location from which the reading of the next sound sequence can start, according to step 317, and after the reproduction of the attenuated signal, the process moves to step 311 where the next frame is received. If the signal sequences were not found to correlate in step 315, this is either caused by the fact that the correct sequence was not read from the memory or that the signal sequence received from the network did not repsesent such a sound sequence that the device would also have caught locally to its microphone.

In order to find out which of the latter alternatives is in question, other possible, corresponding sequences are searched from the memory in the loop formed by steps 321, 322 and 315. If it is found in step 321 that the whole memory has been searched through without finding any correspondence, the sound sequence that corresponds to the signal sequence received from the network is speech coded and reproduced normally in step 323, after which the operation returns to the start.

Figures 4A, 4B:
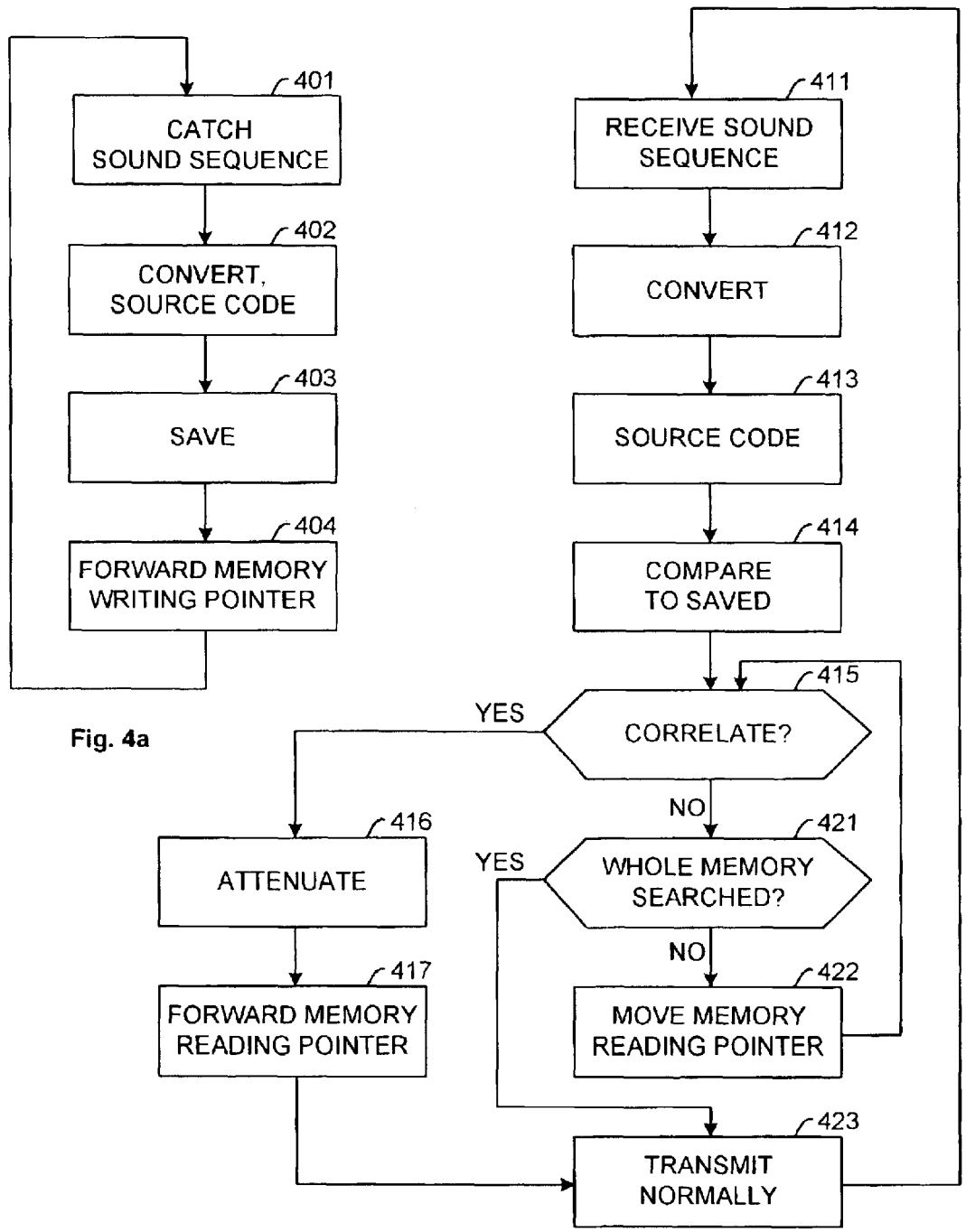
FIG. 4a shows the operation of a transceiver according to a second preferred embodiment of the invention as a flowchart.
FIG. 4b shows the operation of a transceiver according to a second preferred embodiment of the invention as a flowchart.

FIG. 4a depicts the operation of the transmitting side of the transmitting device as a flow chart. Now the sound sequence 401 coming to the microphone is a sound sequence that the user wants to transmit through the network to other equipments. The sound sequence is digitized and source coded 402, after which the source coded, compact sound sequence is saved in the memory of the detector 403. After this, the reading pointer of the memory is moved to point to a memory location from which the reading of the next sound sequence can start 404, and the process continues from step 401. Signal processing of the sound sequence then proceeds in the normal manner (not shown in the figure), as has already several times been described above, and the signal is transmitted to the network.

The signal processing branch that performs the processing shown in FIG. 4b is according to this embodiment actually the same as the transmission branch. This corresponds to a situation in which a message has been sent, and the same message is caught to a microphone 411, when an adjacent device at a range of audibility reproduces it. The sound sequence that was caught and received with a microphone is digitized 412 and speech encoded 413. After this, it is compared to a speech frame 414 saved in step 403. If these correlate 415, this signal is attenuated 416 and the memory reading pointer is moved to point to a location from which the reading of the next sound sequence can start 417, and the sound sequence is transmitted from the antenna as radio waves 423. This means that customary channel coding, modulation and upconversion are carried out for the signal, after which it can be transmitted in the normal manner via the duplexer and antenna. The attenuation instruction given in step 416 now concerns signals, which correlate with the ones already in the memory, i.e. the signals already transmitted once are transmitted in the normal manner as such, but as attenuated according to the invention. After this, the process moves to the reception of the next sound sequence 411. If the signals do not correlate with each other 415, the whole memory is again searched for in the loop 421, 422, 415. When the whole memory has been searched, the audio signal is transmitted in the normal manner 423 so that the signal goes through all the customary signal processing stages of the transmission side.

The embodiment shown in FIGS. 3a, 3b, 4a and 4b has the following advantages: Because the signals received via the microphone are saved in the temporary memory in any case, this existing information can be utilized by increasing the memory space according to need. In addition, it is advantageous to examine the received signal before decoding, because the saved signal is still in the compact, packed form and thus does not take up space. A disadvantage of the embodiment is the fact that the frames to be compared should be exactly synchronized in order to correlate in the comparison. This causes difficulties both in implementation and compatibility between devices and manufacturers.

An embodiment which takes up more memory space but is easier to implement in practice has been shown in FIGS. 5a, 5b, 6a and 6b. Now the received signal is saved for comparison when the signal is in digital form. The signal can be low-pass filtered and decimalized in some suitable manner before it is saved for comparison. The customary echo cancelling is also carried out at this stage of signal processing, and thus the decimalization relations have been examined and there are correlation algorithms available for the samples. These embodiments are described with reference to FIGS. 5 and 6.

Figures 5A, 5B:
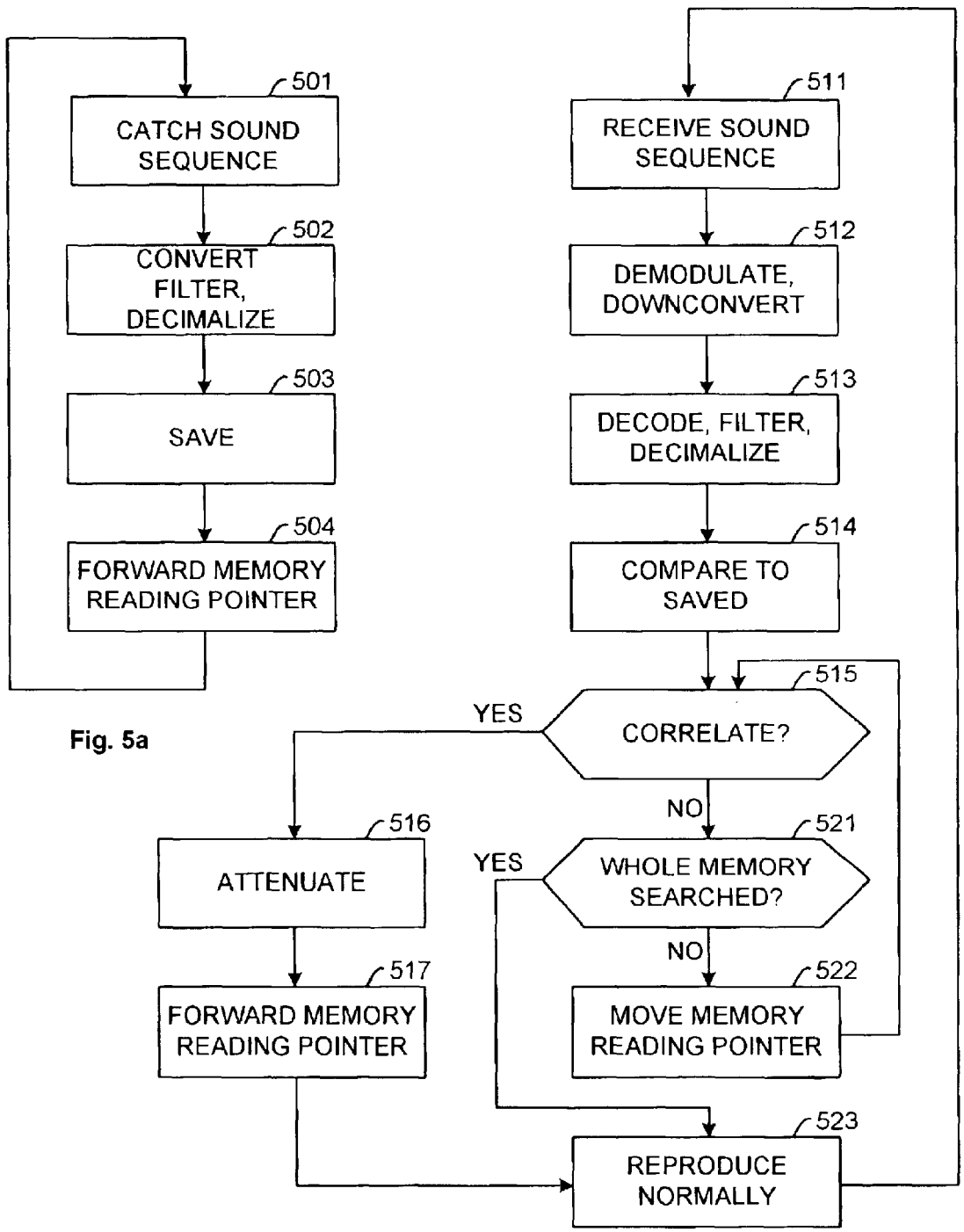
FIG. 5a shows the operation of a transceiver according to a third preferred embodiment of the invention as a flowchart.
FIG. 5b shows the operation of a transceiver according to a third preferred embodiment of the invention as a flowchart.

FIG. 5a shows a non-transmitting device, the microphone of which thus catches a message 501 heard by it, transmitted by another device. The caught message, sound sequence, is digitized, low-pass filtered and decimalized 502. Then the sound sample is saved as a reference sample 503. After this, the writing pointer of the memory is moved to point to a location from which the writing of the next sound sequence can start. Now the device is ready to catch a new sound sequence 501.

In FIG. 5b the same device receives with its antenna 511 the message it just caught with its microphone. The received sound sequence is directed from the duplexer for demodulation and down-conversion 512. After this, the sound sequence to be processed is channel decoded and speech decoded 513. Corresponding low-pass filtering and decimalization as shown in FIG. 5a must also be carried out for the sound sequence. Then the sample is compared to the one saved in the memory earlier 514. In the same way as in the previous embodiments, the correlating signals 515 are attenuated 516 before they are reproduced 523 with the loudspeaker. The whole memory is thus searched in the loop 521, 522, 515.

FIG. 6a shows the operation of the transmitting device. The transmission takes place via the microphone 601, which now obtains the sound sequence intended for transmission. Then the sound sequence is digitized, filtered, decimalized 602 and saved 603 according to a preferred embodiment of the invention in the memory of the detector. After this, the sound sequence goes through the customary signal processing stages and it is finally transmitted via the antenna as radio waves to the network. This has not been illustrated in FIG. 6a, because it is the sampling of the sound sequence and saving it to the memory for comparison in the form presented now that is essential for this embodiment of the invention.

The microphone of the device shown in FIG. 6b receives a sound sequence 611, which is the same as the one just transmitted by the device in step 6a. The received sound sequence is again digitized 612, filtered and decimalized 613, after which it can be compared to the one 614 just saved in step 603. It is again examined in the known manner whether the samples 615, 621, 622 in the memory correlate with the one received. If they correlate, the sound sequence is transmitted as attenuated 616 from the antenna to the network 623, and the memory reading pointer is moved to point to a location from which the reading of the next sound sequence can start 617. Otherwise, if the received signal does not correlate with the signals in the memory, the signal is reproduced with the loudspeaker 623 in the normal manner.

In order to prevent audio circulation, it naturally suffices that the communication device attenuates the acoustic reproduction of the signal it has received. The invention does not prevent the expression of the signal received from the network to the user in some other way. For improving operational reliability, it may even be advantageous to use visual expression, for example, instead of acoustic expression so that always when the device prevents or attenuates the reproduction of a sound sequence received from the network, it lights an indicator light or shows an indicating symbol and/or text on the display. Thus the user need not doubt if the device is operating correctly in the group mode, but he can see that the device has prevented the reproduction of a certain sound sequence on purpose.

What is claimed is:

1. A method for controlling the presentation of audio data in a communication device of a telecommunication network, comprising the steps of:

receiving a certain first signal sequence with a microphone of the communication device, saving a first signal sequence in a temporary memory of a detector unit, receiving with the microphone of the communication device a certain second signal sequence transmitted by other than the communication device, comparing the saved first signal sequence and the received second signal sequence to each other, and if the compared signal sequences correlate, attenuating the received second signal sequence before transmitting it from an antenna.

2. A method according to claim 1, wherein the communication device saves the received first signal sequence to the temporary memory unit of its detector unit after speech encoding and before channel encoding.

3. A method according to claim 2, wherein the second signal sequence received with the microphone is compared after speech encoding and before channel encoding to the first signal sequence saved in the temporary memory unit of the detector unit, and if the compared signal sequences correlate, the presentation of the received second signal sequence is prevented by attenuating the signal sequence before it is transmitted from the antenna.

4. A method according to claim 1, wherein the communication device saves the received first signal sequence to the temporary memory unit of its detector unit after A/D conversion and before speech encoding.

5. A method according to claim 4, wherein the second signal sequence received from the microphone is compared after A/D conversion and before speech encoding to the first signal sequence saved in the temporary memory unit of the detector unit, and if the compared signal sequences correlate, the presentation of the received second signal sequence is prevented by attenuating the signal sequence before it is transmitted from the antenna.

6. Equipment for controlling the presentation of audio data in a communication device of a telecommunication network, the communication device comprising:

a microphone for receiving a certain first signal sequence locally, and for receiving a certain second signal sequence transmitted by other than the communication device, a connection from the microphone to a detector unit for directing a certain first signal sequence from the microphone to the detector unit, a temporary memory unit of the detector unit for saving a certain first signal sequence received locally, means for comparing the saved first signal sequence and the received second signal sequence, and means for attenuating the second signal sequence before transmitting it from an antenna, if the compared signal sequences correlate.

7. Equipment according to claim 6, wherein the detector unit of the communication device includes a memory unit for saving the first signal sequence received locally with a microphone after speech encoding and before channel encoding.

8. Equipment according to claim 7, wherein the communication device includes means for comparing the second signal sequence received from the microphone to the first signal sequence saved in the memory unit of the detector unit after speech encoding and before channel encoding, and means for attenuating the received second signal sequence before it is transmitted from the antenna.

9. Equipment according to claim 6, wherein the detector unit of the communication device includes a memory unit for saving the first signal sequence received locally with a microphone after A/D conversion and before speech encoding.

10. Equipment according to claim 9, wherein communication device includes means for comparing the second signal sequence received from the microphone to the first signal sequence saved in the memory unit after A/D conversion and before speech encoding, and means for attenuating the received second signal sequence before it is transmitted from the antenna.

11. A method for controlling the presentation of audio data in a communication device of a telecommunication network, comprising:

receiving a certain first signal sequence with a microphone of the communication device, saving a first signal sequence in a temporary memory of a detector unit after A/D conversion and speech encoding, receiving from the network a certain second signal sequence, comparing the received second signal sequence with the saved first signal sequence, and if the compared signal sequences correlate, attenuating the received second signal sequence before it is reproduced with a loudspeaker.

12. A method according to claim 11, wherein the received second signal sequence is compared after channel decoding with the saved first signal sequence.

13. Equipment for controlling the presentation of audio data in a communication device of a telecommunication network, the communication device comprising:

a microphone for receiving a certain first signal sequence locally, a connection from the microphone to a detector unit for directing a certain first signal sequence from the microphone to the detector unit, a temporary memory unit of the detector unit for saving a certain first signal sequence received locally after A/D conversion and speech encoding, means for receiving a second signal sequence from the network, means for comparing the saved first signal sequence and the received second signal sequence and means for attenuating the second signal sequence before it is reproduced with a loudspeaker, if the compared signal sequences correlate.

14. Equipment according to claim 13, wherein the communication device includes means for comparing the second signal sequence received from the network after channel decoding to the first signal sequence saved in the memory unit.

* * * * *